US012282732B2

(12) United States Patent
Anders et al.

(10) Patent No.: US 12,282,732 B2
(45) Date of Patent: Apr. 22, 2025

(54) AUTOMATED REVIEW OF COMMUNICATIONS

(71) Applicant: Nuveen Investments, Inc., Chicago, IL (US)

(72) Inventors: Johanna Anders, Huntley, IL (US); John Rybczynski, Streamwood, IL (US); Sai Vijay Anand Ponduru, San Ramon, CA (US); Vinay Abhishek Akkana, Jersey City, NJ (US); Sivakumar Muthusamy, Edison, NJ (US); Santanu Sengupta, Edison, NJ (US)

(73) Assignee: Nuveen Investments, Inc., Chicago, IL (US)

( * ) Notice: Subject to any disclaimer, the term of this patent is extended or adjusted under 35 U.S.C. 154(b) by 379 days.

(21) Appl. No.: 17/404,294

(22) Filed: Aug. 17, 2021

(65) Prior Publication Data

US 2022/0058336 A1  Feb. 24, 2022

Related U.S. Application Data

(60) Provisional application No. 63/067,770, filed on Aug. 19, 2020.

(51) Int. Cl.
| | |
|---|---|
| *G06F 17/00* | (2019.01) |
| *G06F 16/93* | (2019.01) |
| *G06F 40/169* | (2020.01) |
| *G06Q 30/018* | (2023.01) |
| *G06V 30/416* | (2022.01) |

(52) U.S. Cl.
CPC ............ *G06F 40/169* (2020.01); *G06F 16/93* (2019.01); *G06Q 30/018* (2013.01); *G06V 30/416* (2022.01)

(58) Field of Classification Search
CPC ..... G06F 40/169; G06F 16/93; G06V 30/416; G06Q 30/018
See application file for complete search history.

(56) References Cited

U.S. PATENT DOCUMENTS

| | | | | |
|---|---|---|---|---|
| 10,318,804 | B2 * | 6/2019 | Powell | G06F 18/251 |
| 11,030,232 | B1 * | 6/2021 | Reich | G06F 16/38 |
| 11,443,102 | B1 * | 9/2022 | Wilson | G06F 3/0482 |
| 2009/0138257 | A1 * | 5/2009 | Verma | G06F 40/289 704/E15.022 |
| 2013/0104029 | A1 * | 4/2013 | Hendry | G06F 40/117 715/234 |
| 2013/0198094 | A1 * | 8/2013 | Arazy | G06Q 50/18 705/317 |
| 2014/0214758 | A1 * | 7/2014 | Tripathi | G06F 16/93 707/608 |

(Continued)

*Primary Examiner* — Mohammed H Zuberi
(74) *Attorney, Agent, or Firm* — Lowenstein Sandler LLP

(57) ABSTRACT

A method of automated review of communications comprises: receiving, by a computer system, a document from a requestor application; extracting layout information and text from the document; extracting, based on the layout information, values of one or more predefined data items from the text of the document; producing a document validation result by analyzing the one or more data items; embedding, into the document, one or more human-readable comments reflecting the document validation result; and forwarding, to the requestor application, the document comprising the one or more human readable comments.

19 Claims, 5 Drawing Sheets

(56) References Cited

U.S. PATENT DOCUMENTS

| | | | |
|---|---|---|---|
| 2015/0106385 A1* | 4/2015 | Clark | G06F 40/169 |
| | | | 707/748 |
| 2015/0324640 A1* | 11/2015 | Macciola | G06V 20/62 |
| | | | 382/112 |
| 2019/0005012 A1* | 1/2019 | Priestas | G06N 20/00 |
| 2019/0294874 A1* | 9/2019 | Orlov | G06N 3/084 |
| 2020/0160050 A1* | 5/2020 | Bhotika | G06V 30/414 |
| 2020/0210377 A1* | 7/2020 | Struck | G06F 16/125 |
| 2020/0401574 A1* | 12/2020 | Sexton | G06F 16/2428 |
| 2021/0081664 A1* | 3/2021 | Weller | G06F 40/226 |
| 2022/0207268 A1* | 6/2022 | Gligan | G06F 40/137 |

* cited by examiner

AUTOMATED REVIEW OF COMMUNICATIONS

REFERENCE TO RELATED APPLICATION

This application claims the benefit of U.S. Provisional Patent Application No. 63/067,770, filed Aug. 19, 2020, the entirety of which is incorporated herein by reference.

TECHNICAL FIELD

Embodiments of the disclosure are generally related to natural language processing, and more specifically, are related to systems and methods of automated review of communications.

BACKGROUND

Formal communications (e.g., marketing communications including documents, web sites, social media postings, presentations, articles, etc.) initiated by organizations operating in regulated industries may be subject to various regulatory requirements. Ensuring regulatory compliance is usually performed by human reviewers, and thus may be a resource-intensive and/or time-intensive process.

BRIEF DESCRIPTION OF THE DRAWINGS

The present disclosure will be understood more fully from the detailed description given below and from the accompanying drawings of some embodiments of the disclosure.

DETAILED DESCRIPTION

Figure 1:
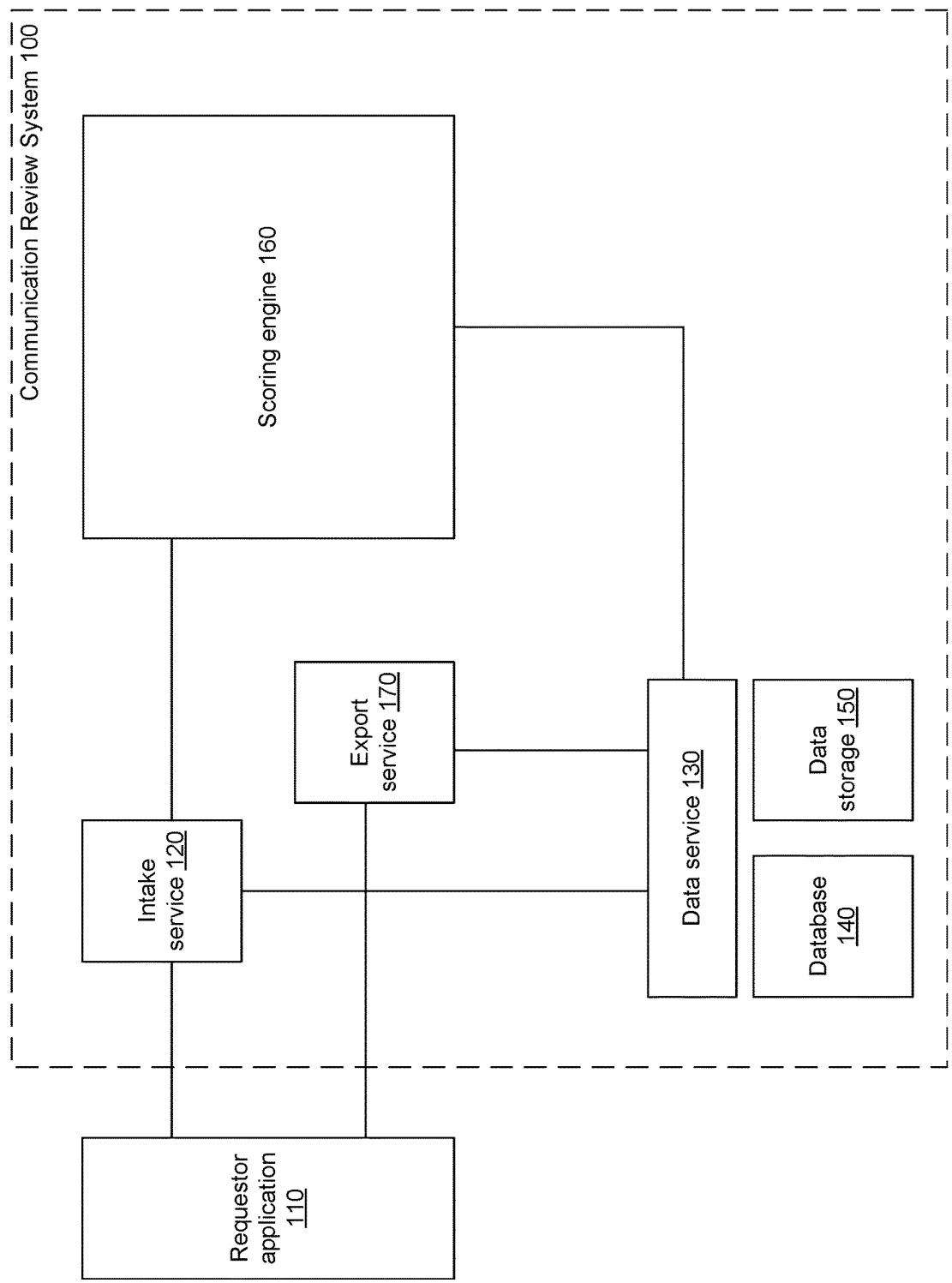
FIG. 1 schematically illustrates a high-level component diagram of the communication review system 100 for automated review of communications, implemented in accordance with aspects of the present disclosure.

Described herein are systems and methods of automated review of communications. In some implementations, such communications may include various marketing materials, such as documents, web sites, social media postings, presentations, articles, etc. The purpose of the review may be to ascertain compliance of the communications with one or more specified policies, such as content policies, style policies, layout policies, etc. In an illustrative example, a content policy may be designed to ensure regulatory compliance of the reviewed communication with respect to certain rules (specifications, policies, standards, or laws) promulgated by a relevant regulatory body. In another illustrative example, a style policy may be designed to ensure compliance of the reviewed communication with a set of stylistic rules with respect to the semantic and/or visual aspects of the communication. In another illustrative example, a layout policy may be designed to ensure compliance of the reviewed communication with a set of document layout rules (e.g., reflecting the document visual layout and/or semantic structure).

The systems and methods of the present disclosure increase the efficiency of the communication compliance review process by applying various natural language processing methods, including rule-based and machine learning-based information extraction methods. The systems and methods described herein are capable of being seamlessly integrated with existing workflow management applications, thus significantly reducing the time to prepare communications, making automated compliance reviews readily available around the clock, and ensuring consistency in the creation of content, compliance reviews, and application of regulatory disclosures to materials.

The systems and methods of the present disclosure provide automated fast track review of communications that do not require substantive changes. In some implementations, the systems and methods of the present disclosure may also identify, within the communications being reviewed, specific passages that require a more targeted review, accurately validate submission metadata, review content, and automate the compliance review process. This functionality minimizes manual intervention, thus eliminating time-intensive review tasks previously performed by the compliance review team and reducing the risk of mistakes and helping to ensure consistent oversight. It also reduces the time required to address certain easily addressable issues. Finally, the systems and methods of the present disclosure allow implementing a sustainable platform that is capable of scaling as the number of submissions exponentially grows over time.

The systems and methods of the present disclosure implement modular functionality, thus allowing flexibility in scheduling, managing, and conducting reviews of the communications by members of business, legal, marketing, engineering, and/or other functional teams. The systems and methods of the present disclosure also provide self-service capabilities for key reference data updates, thus allowing the users to make necessary changes quickly and efficiently to ensure continuous alignment with evolving business processes.

Thus, the systems and methods of the present disclosure may be utilized by various business areas to increase automation and expand the use of analytics to more efficiently perform business processes across the organization.

Various aspects of the methods and systems are described herein by way of examples, rather than by way of limitation. The methods described herein may be implemented by hardware (e.g., general purpose and/or specialized processing devices, and/or other devices and associated circuitry), software (e.g., instructions executable by a processing device), or a combination thereof.

FIG. 1 schematically illustrates a high-level component diagram of the communication review system 100 for automated review of communications, implemented in accordance with aspects of the present disclosure. The designation of modules of the system 100 is purely functional, i.e., in various implementations, each functional module may be implemented by one or more processing threads instantiated by one or more applications running on one or more physical or virtual servers; alternatively, two or more functional modules may be combined into one or more processing threads instantiated from a single software application.

As shown in FIG. 1, the communications may be created by the requestor application 110 in the form of documents (e.g., in the PDF or any other suitable format) and associated metadata. The metadata may be incorporated into a document and/or provided in separate metadata file. The metadata may include one or more parameters characterizing various aspects of the document, such as document type, author, creation/modification timestamp, content category, intended audience, review type, priority, access rights, etc. In an illustrative example, the requestor application 110 may be represented by a workflow engine managing creation and processing of documents.

The intake service 120 may retrieve the created documents and the associated metadata from the requestor application 110 and forward the retrieved documents and the associated metadata to the data service 130. In an illustrative example, the document retrieval may be performed by the intake service 120 periodically polling the requestor application 110. The polling may be performed by issuing series of document retrieval queries. In an illustrative example, each document retrieval query may be wrapped into an application programming interface (API) call of an API exposed by the requestor application 110. In another illustrative example, each document retrieval query may be wrapped into a Hypertext Transfer Protocol (HTTP) request directed to a Uniform Resource Locator (URL) associated with the requestor application 110.

Each document retrieval query may include one or more document retrieval parameters. In an illustrative example, the document retrieval query may be directed to all documents that have been created or modified within a specified timeframe (e.g., since the latest successful document retrieval operation). In another illustrative example, the document retrieval query may be directed to all documents that have their status within the internal workflow of the requestor 110 updated within a specified timeframe (e.g., since the latest successful document retrieval operation). In another illustrative example, the document retrieval query may be directed to one or more documents specified by their respective document identifiers (including document type identifiers or unique document identifiers).

In other implementations, the document retrieval may be performed by the intake service 120 receiving push notifications from the requestor application 110 (e.g., via an API exposed by the intake service 120).

In some implementations, the intake service 120 may perform optional preprocessing of the retrieved documents. Such preprocessing may include optical character recognition, format conversion, and/or various other operations.

The intake service 120 may forward the retrieved documents and the associated metadata to the data service 130, which abstracts local storage and retrieval details from other components of the communication review system 100 by exposing an API for storing, retrieving, and updating documents and their associated metadata. In some implementations, the data service 130 may also perform embedding of certain metadata items (such as human-readable comments produced by the scoring engine 160, as described in more detail herein) into the document files.

The data service 130 may maintain the status of each document in the database 140. The data service 130 may periodically check the document status in order to identify stalled and/or misrouted documents within the processing pipeline. Upon identifying a stalled or misrouted document, the data service 130 may reset its status to the last known good status, thus restarting the processing pipeline for the identified document. In an illustrative example, the document status may include the Ready status (the document has been received by the intake service 120 and is ready for processing by the scoring engine 160), the Processing status (the document is being processed by the scoring engine 160), the Processed status (the document has been processed by the scoring engine 160), and the Archived status (the document has been forwarded to the requestor 110).

The data service 130 may utilize the data storage 150 and/or the database 140. The data storage 150 may be provided, e.g., by a Network Attached Storage (NAS). The database 140 may be provided, e.g., by a relational database. Thus, architecture and implementations of the data storage 150 and database 140 is abstracted from other components of the communication review system 100, thus encapsulating the full control of the data storage 150 and database 140 within the data service 130. This approach allows modifying the architecture and/or implementations of data storage 150 and/or the database 140 without affecting other components of the communication review system 100, which may be useful, e.g., for scaling and/or migration of the service.

In an illustrative example, the database schema implemented by the database 140 may include Submissions table, which tracks the submissions and their statuses. The database schema may further include Documents table, which maps document identifiers (e.g., document names) to their locations in the data storage 150. The database schema may further include Review Comments table, which stores the comments generated by the scoring engine 160. In some implementations, the database schema may include various other tables, indices, stored procedures, triggers, and/or other elements.

Responsive to receiving, from the intake service 120, one or more documents and associated metadata, the data service 130 may store the received documents and the associated metadata in the database 140 and/or data storage 150. The data service 130 may further update one or more tables of the database 140 to reflect the newly received submission, e.g., by creating and/or updating one or more records in the Submission table and Documents table.

Upon updating the database 140, the data service 130 notifies the scoring engine 160, which processes the received documents and returns the review results (e.g., in the form of comments associated with the document identifier) to the data service 130. The processing may include metadata validation, text extraction, layout tagging, language analysis, and requirements testing, as described in more detail herein.

Upon processing an input document, the scoring engine 160 forwards the review results (e.g., including the updated document and one or more human-readable comments) to the data service 130, which may store the received review result in the database 140 and/or data storage 150. In an illustrative example, the review result may be stored in the database 140 as one or more metadata items associated with the specified document. The data service 130 may further update one or more tables of the database 140 to reflect the review status of the document, e.g., by setting the data field specifying the review status of the document to the value indicating that the review has been completed.

The export service 170 may periodically poll the data service 130 for the completed documents. The polling may be performed by issuing series of document retrieval queries. In an illustrative example, each document retrieval query may be wrapped into an API call of an API exposed by the data service 130. In another illustrative example, each document retrieval query may be wrapped into one or more HTTP requests directed to a URL associated with the data service 130.

Upon retrieving one or more documents and their associated metadata, the export service 170 may forward the retrieved documents and their updated statuses to the requestor application 110. For each retrieved document, the export service 170 may issue a document submission query to the requestor application 110. In an illustrative example, the document submission query may be wrapped into an API call of an API exposed by the requestor application 110. In another illustrative example, the document submission query may be wrapped into one or more HTTP requests directed to a URL associated with the requestor application 110. The document submission query may include an identifier of the document being submitted, at least part of the document, and/or associated metadata. The identifier of the document may be utilized for retrieving the document from the data storage 150.

The metadata may include one or more human-readable comments generated by the scoring engine 160. In some implementations, one of the comments may include an instruction (e.g., "Review the document for embedded automatically generated compliance review comments"), which may be utilized by the requestor application 110 for automatically generating user notifications. The user notifications may be displayed via a graphical user interface (GUI) and/or provided in the form of electronic mail messages, short messaging service (SMS) messages, and/or similar messaging technologies.

In some implementations, the metadata may further include the updated document status, which may be determined based on the outcome of various stages of document review by the scoring engine 160. Accordingly, the requestor application 110 may utilize the metadata for updating the status of its internal workflow to reflect the result of the automated review by the scoring engine 160.

Figure 2:
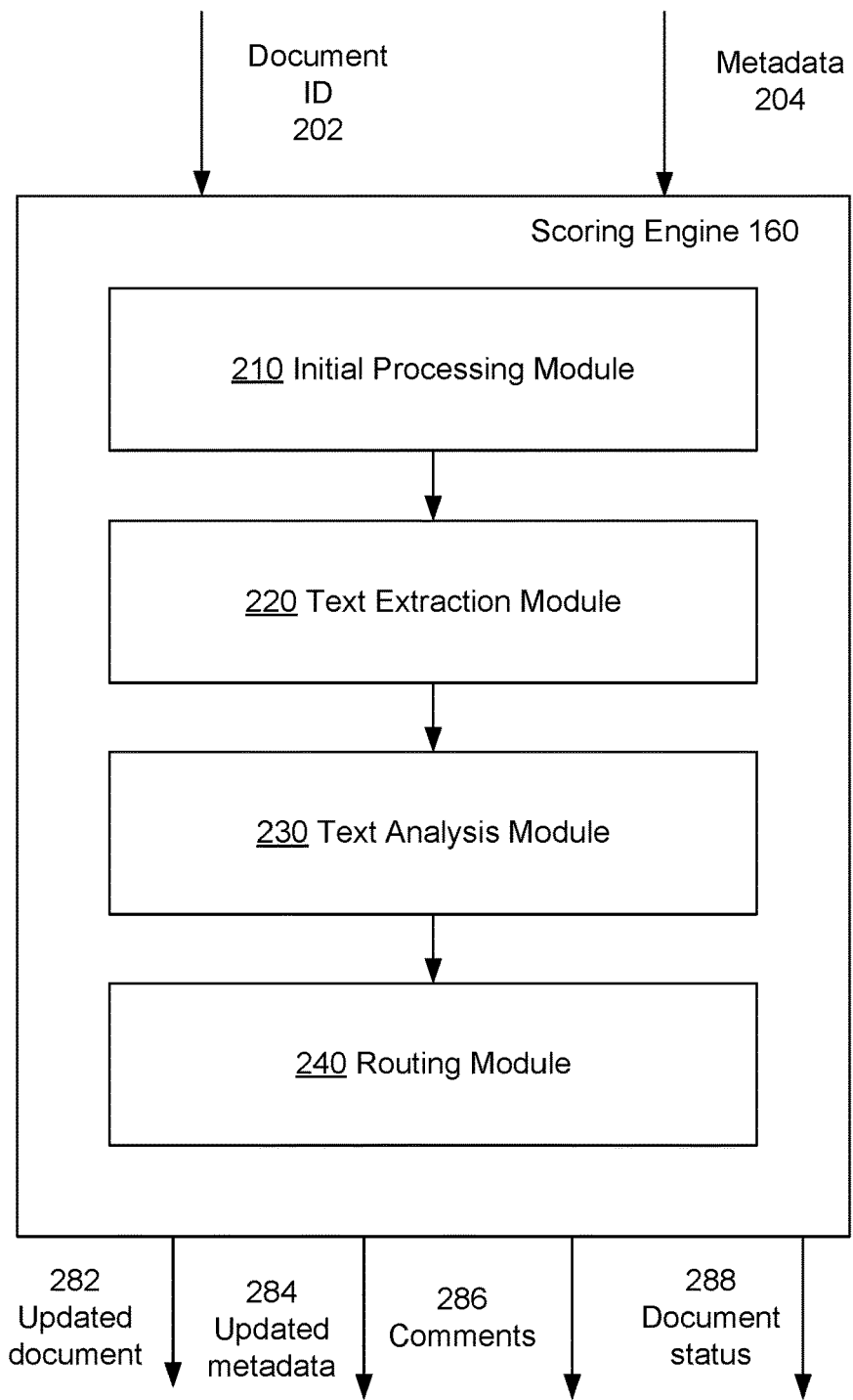
FIG. 2 schematically illustrates the functional structure of the scoring engine implemented in accordance with aspects of the present disclosure.

FIG. 2 schematically illustrates the functional structure of the scoring engine 160. As shown in FIG. 2, the scoring engine 160 may include the initial processing module 210, the text extraction module 220, the text analysis module 230, and the routing module 240. The designation of modules of the scoring engine 160 is purely functional, i.e., in various implementations, each functional module may be implemented by one or more processing threads instantiated by one or more applications running on one or more physical or virtual servers; alternatively, two or more functional modules may be combined into one or more processing threads instantiated from a single software application.

The input to the scoring engine 160 may include one or more identifiers 202 of locations of the documents to be analyzed (e.g., provided by directory names and/or file names in the data storage 150) and the document metadata 204 (e.g., in the form of a JSON file).

The output of the scoring engine 160 may include the updated document 282, updated document metadata 284, the list 286 of comments pertaining to the results of analyzing the input document(s), and the identifier 288 of the updated status of the document to be returned to the requestor module 210. The scoring engine 160 may notify the data service 130, which may update the database 140 and change the processing status of the documents (e.g., to the "processed" status).

The initial processing module 210 may perform metadata validation, e.g., by applying one or more sets of metadata validation rules to various subsets of metadata items associated with the input document. The metadata validation rules may validate the values of certain metadata items and/or data items extracted from the input document against one or more stored data dictionaries that specify valid values and/or ranges for certain metadata or data items. The validation rules may further cross-validate the values of certain metadata items and/or data items extracted from the input document. In various illustrative examples, a cross-validation rule may specify an expected result of comparing two metadata items of the input document, or an expected result of comparing a metadata item and a data item extracted from an input document.

In some implementations, the initial processing module 210 may validate the product type referenced by the input document. In various examples, the product types may identify a financial product falling under one of the following classes: insurers, registered investment companies, investment advisors, alternative/private funds, non-listed real estate investment trusts (REITs), joint ventures, or co-investments. Product type validation may involve searching the input document for specific predefined and/or generic product names matching corresponding dictionaries of specific product names and/or generic product names. In some implementations, if no specific product name is found in the document, a fuzzy search may be performed using at least a subset of the generic product names, and a predefined number of the best hits produced by the fuzzy search is used as identifiers of one or more product types. The identified product name and product type may then be utilized for performing various product-specific validation operations.

In some implementations, the initial processing module 210 may validate the intended audience of the document. The intended audience may be specified by a corresponding metadata field or may be derived from the document. Accordingly, upon identifying the intended audience, the initial processing module 210 may identify the required regulatory disclosures for the intended audience (e.g., by inspecting a data structure mapping audience types to required regulatory disclosures) and ascertain whether the text of the required regulatory disclosures is present in the document being analyzed. If the text of all required regulatory disclosures is present in the document, the initial processing module 210 may update the document metadata to indicate that the audience has been successfully validated; otherwise, should at least one required regulatory disclosure be absent from the document, a human-readable comment may be associated with the document (e.g., embedded into the document file) to identify the missing regulatory disclosure.

In some implementations, the initial processing module 210 may generate missing metadata items (e.g., by applying one or more sets of validation rules to the input document and/or to the associated metadata). The missing metadata items may specify the file type, the document type, the product type(s) referenced by the document, and/or various other parameters characterizing the document.

In some implementations, the initial processing module 210 may also retrieve the documents referenced by embedded hyperlinks found in the input document. The initial processing module 210 may convert the retrieved documents to a predefined format (e.g., Portable Document Format (PDF)). For each referenced document, the initial processing module 210 may retrieve its compliance review status and/or other relevant metadata from the database 140.

The text extraction module 220 ingests and processes incoming documents in various file formats (e.g., PDF, email messages, presentations, word processor-created documents, spreadsheets, etc.). The text extraction module 220 performs text extraction and outputs the extracted text and document attributes. In some implementations, the text extraction module 220 may perform layout extraction with respect to input documents that follow predefined templates. Text extraction module 220 may apply one or more configurable rules to determine font and layout attributes and identify various objects (lines, rectangles), their coordinates, and white spacing around these objects. The identified document attributes may form document-level metadata, which may be fed as input parameters to one or more trainable classifiers for identifying various document elements (e.g., sections, tables, etc.).

For documents that do not follow one of the predefined templates, the text extraction module 220 may perform basic text extraction to identify blocks (e.g., paragraphs) of texts and the corresponding location information such as page number and coordinates (e.g., line number and position within the line).

The output of the text extraction module 220 may include a data structure (e.g., a dataframe), which stores the structured text of the document. In an illustrative example, the data structure produced by the text extraction module 220 may include one or more records, such that each record includes the extracted text, the document section identifier (e.g., section title), the object type identifier (e.g., table), the object tag (e.g., Table 1), the layout tag associated with the text (e.g., "Body text"), and a functional tag associated with the text (e.g., "Disclosure").

The text analysis module 230 may process the output of the text extraction module 220 to validate various sections of the input document and generate human-readable comments reflecting the validation results for the reviewer. In some implementations, the text analysis module 230 may embed the generated human-readable comments into the input document, such that the comments would be visible to a user (e.g., in respective popup windows) upon opening the document in a suitable document viewing or editing application. Each comment may include a textual description of the detected validation issue, a textual description of a suggested course of a remedial action to be taken by the user, a timestamp, and an alphanumeric string identifying the communication review system 100 as the author of the comment.

The text analysis module 230 may analyze font and document layout information (such as coordinates, line spacing, and text and line objects) in order to identify and tag various document elements, including, e.g., document title, subtitle, section titles, tables, body text, and disclosures. For documents that do not follow one of the predefined templates, text analysis module 230 may perform validations based on the text extracted from the text extraction module 220.

The text analysis module 230 may further validate the document against various requirements that may be determined based on the document type, the product type, the intended audience, and/or various other parameters of the document. The requirements may be represented, e.g., by one or more sets of configurable rules, such that each rule may specify valid values or ranges for various data items extracted from the document.

In various illustrative examples, the text analysis module 230 may extract and validate the document name, the document date, the publication date, and/or the product name. In some implementations that target marketing communications related to financial products, the text analysis module 230 may further extract and validate various numeric identifiers (e.g., International Securities Identification Numbers (ISINs)), inceptions dates for various share classes and tickers, model classes, portfolio managers, portfolio decryptions, investment objectives, word on risk sections, investment advisers, annualized total returns, calendar year returns, and/or glossary terms. In some implementations, the information extraction may be performed by applying information extraction rules to the document layout information and to the text produced by the text extraction module 220. Each information extraction rule may specify the document section, one or more keywords, text parsing parameters, and/or other parameters corresponding to a certain data item (such as named entity) to be extracted from the text.

In some implementations, the information extraction may be performed by employing trainable machine learning-based models to the document layout information and to the text produced by the text extraction module 220.

In some implementations, validation of the extracted information may be based on the available product information (e.g., represented by a product matrix), which may specify one or more features, parameters, or characteristics of the product.

In some implementations, the text analysis module 230 may perform the regulatory disclosure validation. The text analysis module 230 may search, within the text extracted from the document by the text extraction module 220, for texts of one or more regulatory disclosures that are required for the document based on the document type, audience type, and/or various other document data and metadata items. Responsive to determining that the text is found in the document that matches the required disclosure by at least a predefined match threshold (e.g., 90%), the text analysis module 230 may conclude that the required disclosure is present. Otherwise, responsive to determining that the text is found in the document that matches the required disclosure by less than the match threshold (e.g., less than 90%), the text analysis module 230 may conclude that the required disclosure is present, but is incorrect, and an appropriate remedial action is required. Otherwise, responsive to failing to find the text in the document that would match the required disclosure, the text analysis module 230 may conclude that the required disclosure is not present, and an appropriate remedial action is required. The text analysis module 230 may associate, with the document being analyzed, a metadata item reflecting the disclosure analysis.

Figure 3:
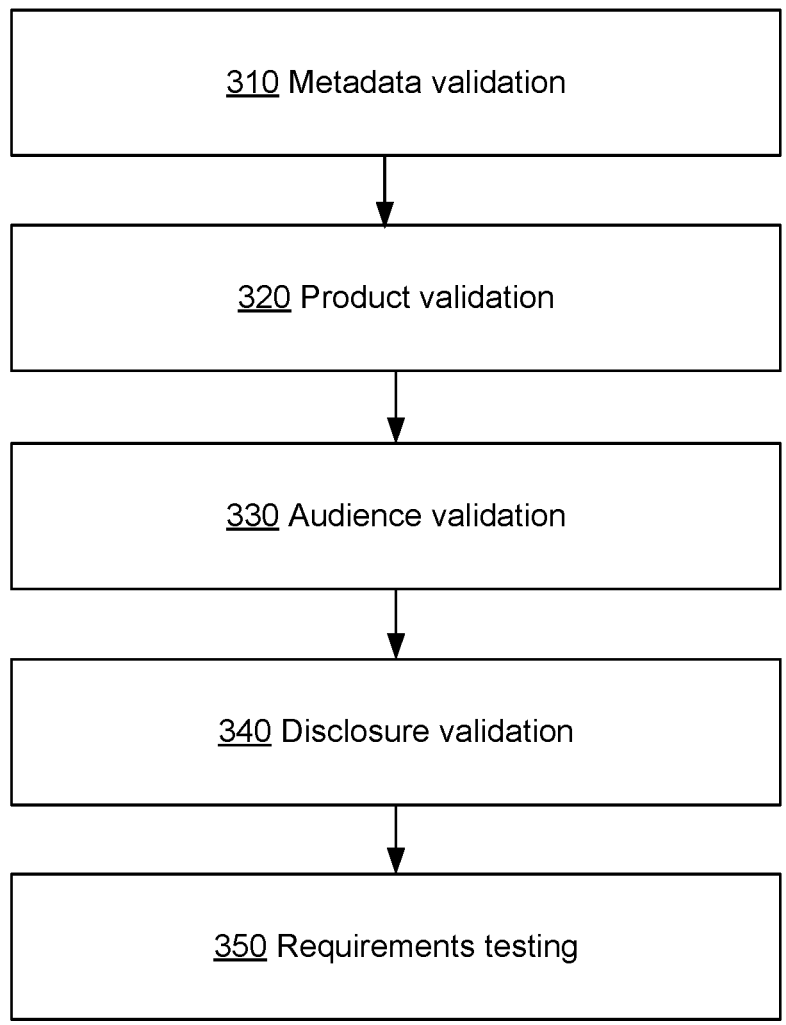
FIG. 3 schematically illustrates text analysis and validation operations performed by the text analysis module implemented in accordance with aspects of the present disclosure.

FIG. 3 schematically illustrates text analysis and validation operations performed by the text analysis module 230. In some implementations, the text analysis and validation operations may be performed by a single processing thread. Alternatively, the text analysis and validation operations may be performed by two or more processing threads, each thread executing one or more individual functions, routines, subroutines, or operations. In an illustrative example, the processing threads implementing the text analysis and validation operations may be synchronized (e.g., using semaphores, critical sections, and/or other thread synchronization mechanisms). Alternatively, the processing threads implementing the text analysis and validation operations may be executed asynchronously with respect to each other. Therefore, while FIG. 3 and the associated description list the text analysis and validation operations in certain order, various implementations may perform at least some of the described operations in parallel and/or in arbitrary selected orders. As schematically illustrated by FIG. 3, the text analysis and validation operations may include metadata validation 310, product validation 320, audience validation 330, disclosure validation 340, and requirements testing 350, as described in more detail herein.

Accordingly, the output of the text analysis module 230 may include a data structure (e.g., a dataframe) storing the validated content of the document and corresponding comments. In an illustrative example, the data structure produced by the text analysis module 230 may include one or more records, such that each record includes the document text, the corresponding document section identifier (e.g., section title), the object type identifier (e.g., table), the object tag (e.g., Table 1), the layout tag associated with the text (e.g., "Body text"), a functional tag associated with the text (e.g., "Disclosure"), and the comments generated by the scoring engine 160 with respect to the section of the text.

The routing module 240 may receive the output generated by the text analysis module and return to the requestor application 110 the updated document metadata (e.g., the updated JSON file) and the updated document with the embedded human-readable comments reflecting the validation results produced by the scoring engine 160. In some implementations, the routing module 240 may also forward to the requestor a list of comments reflecting the validation results produced by the scoring engine 160.

In some implementations, the routing module 240 may also populate one or more comment fields of the requesting workflow (e.g., implemented by the requestor application 110). The comments may include a textual description of the final routing decision made by the routing module 240 with respect to the document being analyzed. The comments may further include textual descriptions of one or more validation issues detected by the scoring engine 160.

In some implementations, the routing module 240 may update the status of the document in the requesting workflow (e.g., implemented by the requestor application 110) to reflect the final routing decision made by the routing module 240. The routing decisions made by the routing module 240 may include promoting the document to the approved status, returning the document to the submitter, or forwarding the document for further review. In an illustrative example, responsive to determining that the document has successfully passed all validation checks and no significant issues have been detected, the routing module 240 may update the status field of the requesting workflow to promote the document to the approved status, thus bypassing any subsequent review stages, which would otherwise be implemented by the requesting workflow. In another illustrative example, responsive to detecting an unrecoverable error during any processing stage, the routing module 240 may update the status field of the requesting workflow to demote the document to the Return to Submitter status, thus causing the requesting workflow to return the document to the submitter. In an illustrative example, responsive to determining that one or more issues were detected by the document validation checks, the routing module 240 may update the status field of the requesting workflow to promote the document to the Further Review status, thus causing the requesting workflow to forward the document with the embedded comments and other relevant metadata to a further review stage (e.g., manual review by a member of the communication review team).

In an illustrative example, the routing module 240 may update the status of the document in the requesting workflow by invoking an API call of an API exposed by the requestor application 110. Parameters of the API call may include the document identifier and the updated document status. In another illustrative example, the routing module 240 may update the status of the document by issuing an HTTP request directed to a URL associated with the requestor application 110. Parameters of the request may include the document identifier and the updated document status.

Figure 4:
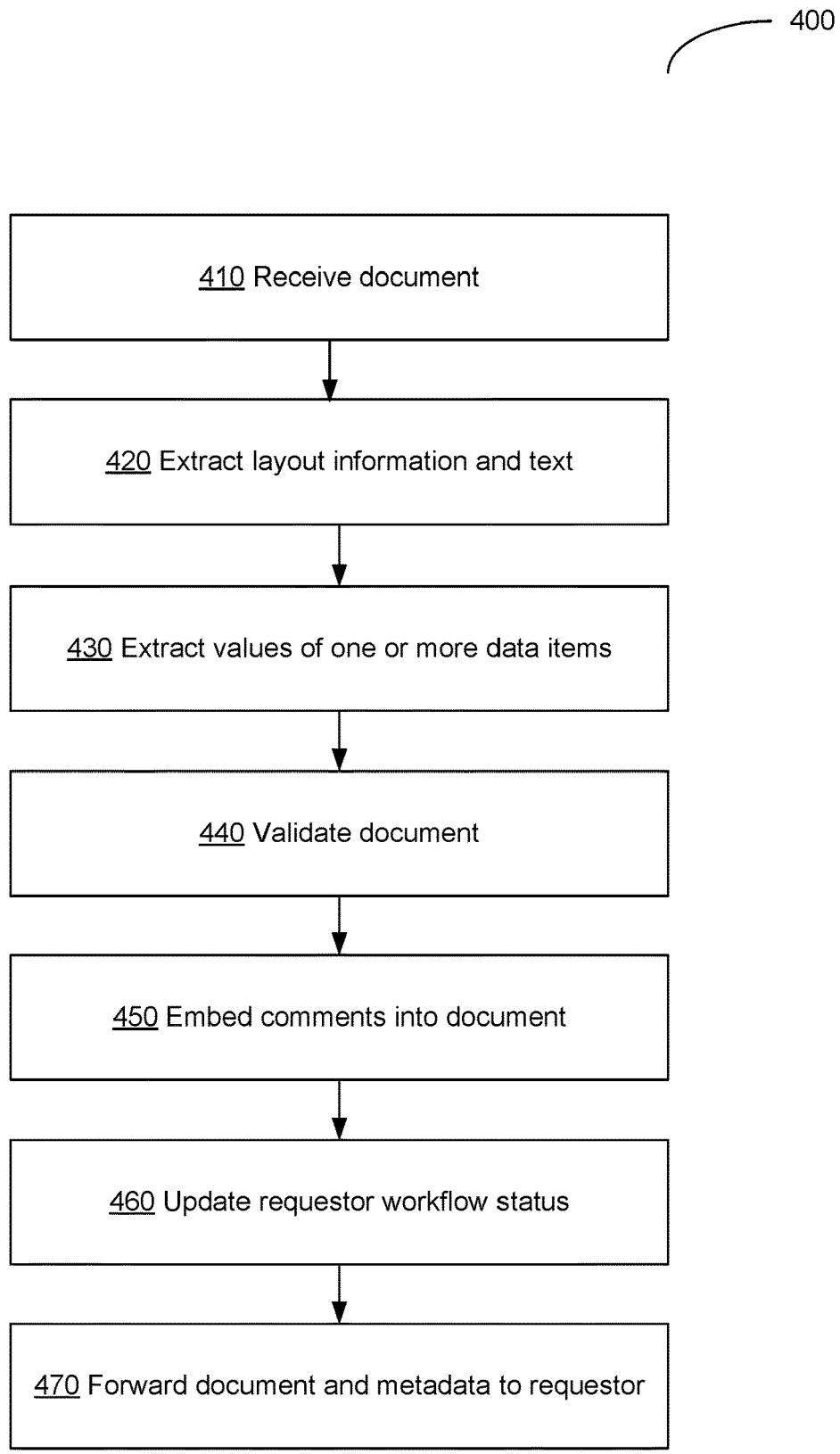
FIG. 4 is a flow diagram illustrating the method of automated review of communications, in accordance with aspects of the present disclosure.

FIG. 4 is a flow diagram illustrating the method 400 of automated review of communications, in accordance with aspects of the present disclosure. The method 400 may be performed by processing logic that may comprise hardware (e.g., circuitry, dedicated logic, programmable logic, microcode, etc.), software (such as instructions run on a processing device), firmware, or a combination thereof. In one implementation, the method 400 may be performed by a computer system (e.g., the computer system 500 of FIG. 5). In certain implementations, the method 400 may be performed by a single processing thread. Alternatively, the method 400 may be performed by two or more processing threads, each thread executing one or more individual functions, routines, subroutines, or operations of the method. In an illustrative example, the processing threads implementing the method 400 may be synchronized (e.g., using semaphores, critical sections, and/or other thread synchronization mechanisms). Alternatively, the processing threads implementing the method 400 may be executed asynchronously with respect to each other. Therefore, while FIG. 4 and the associated description list the operations of the method 400 in certain order, various implementations of the methods may perform at least some of the described operations in parallel and/or in arbitrary selected orders.

At operation 410, the computer system implementing the method receives, from a requestor application, a document to be analyzed. In an illustrative example, the requestor application may be represented by a workflow engine managing creation and processing of documents, as described in more detail herein.

At operation 420, the computer system extracts layout information and text from the document. In some implementations, the computer system may determine font and layout attributes and identify various objects (lines, rectangles), their coordinates, and white spacing around these objects.

At operation 430, the computer system extracts, based on the layout information, values of one or more predefined data items from the text of the document. The information extraction may be performed by applying configurable rules to the document layout information and document text, as described in more detail herein.

At operation 440, the computer system validates the document by analyzing the one or more data items extracted from the document and/or one or more items of the associated metadata. The validation operations may include metadata validation, product validation, audience validation, disclosure validation, and requirements testing, as described in more detail herein.

At operation 450, the computer system embeds, into the document, one or more human-readable comments reflecting the document validation result, as described in more detail herein.

At operation 460, the computer system updates the status of the document in the workflow implemented by the requestor application, as described in more detail herein.

At operation 470, the computer system forwards, to the requestor application, the document comprising the one or more human readable comments, as described in more detail herein.

Figure 5:
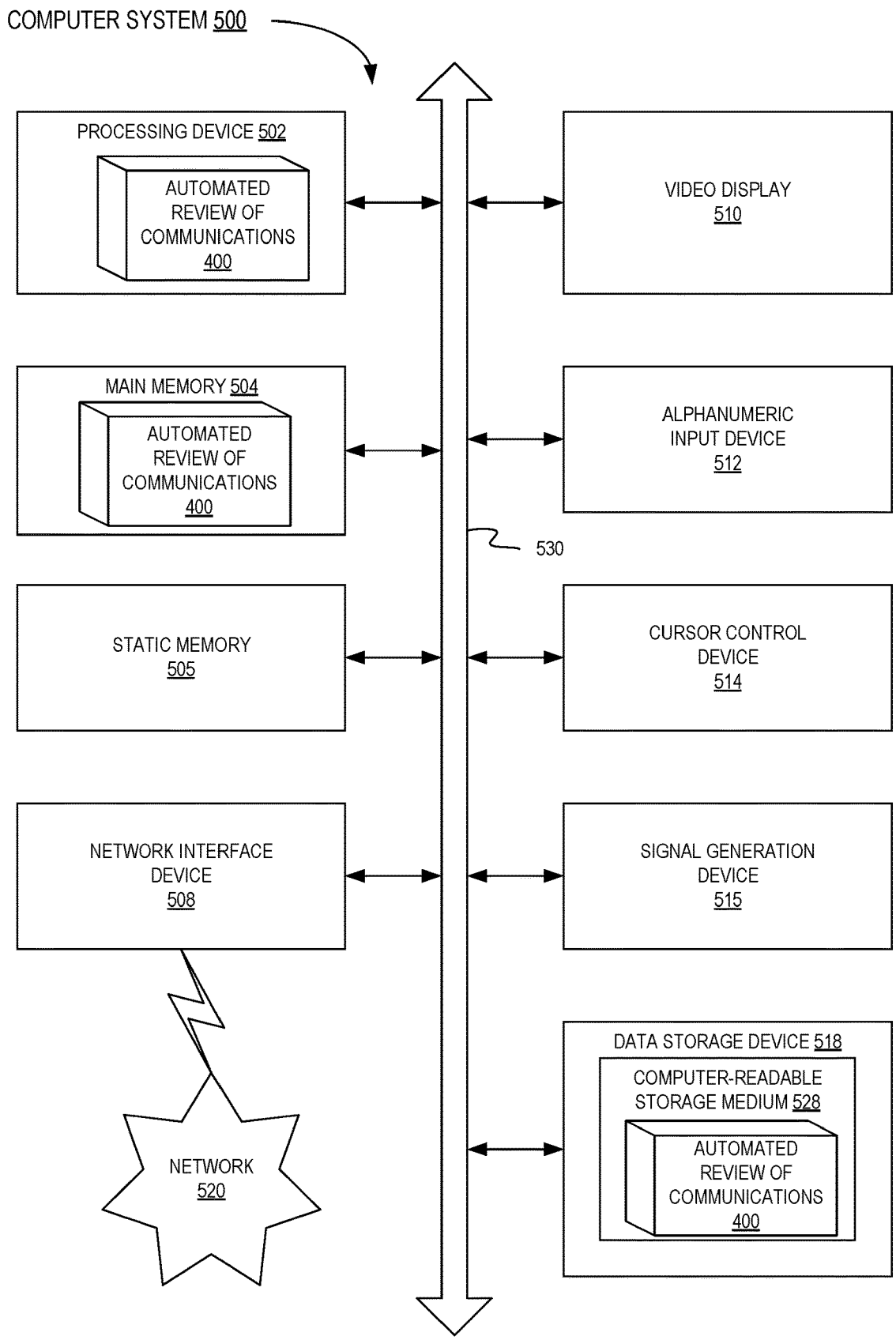
FIG. 5 is a block diagram of an example computer system, in which embodiments of the present disclosure may operate.

FIG. 5 illustrates a diagrammatic representation of a computer system 500, which may be employed for implementing the methods described herein. The computer system 500 may be connected to other computing devices in a LAN, an intranet, an extranet, and/or the Internet. The computer system 500 may operate in the capacity of a server machine in a client-server network environment. The computer system 500 may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computer system" shall also be taken to include any collection of computing devices that individually or jointly execute a set (or multiple sets) of instructions to perform the methods discussed herein. In illustrative examples, the computer system 500 may represent one or more servers of a distributed computer system implementing the above-described method 400 of automated review of communications.

The example computer system 500 may include a processing device 502, a main memory 504 (e.g., synchronous dynamic random access memory (DRAM), read-only memory (ROM)), and a static memory 505 (e.g., flash memory and a data storage device 518), which may communicate with each other via a bus 530.

The processing device 502 may be provided by one or more general-purpose processing devices such as a microprocessor, central processing unit, or the like. In an illustrative example, the processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also comprise one or more special-purpose processing devices such as an application specific integrated circuit (ASIC), a field programmable gate array (FPGA), a digital signal processor (DSP), a network processor, or the like. The processing device 502 may be configured to execute the methods of automated review of communications, in accordance with one or more aspects of the present disclosure.

The computer system 500 may further include a network interface device 508, which may communicate with a network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and/or an acoustic signal generation device 515 (e.g., a speaker). In one embodiment, video display unit 510, alphanumeric input device 512, and cursor control device 514 may be combined into a single component or device (e.g., an LCD touch screen).

The data storage device 518 may include a computer-readable storage medium 528 on which may be stored one or more sets of instructions (e.g., instructions of the methods of automated review of communications, in accordance with one or more aspects of the present disclosure) implementing any one or more of the methods or functions described herein. The instructions may also reside, completely or at least partially, within main memory 504 and/or within processing device 502 during execution thereof by computer system 500, main memory 504 and processing device 502 also constituting computer-readable media. The instructions may further be transmitted or received over a network 520 via network interface device 508.

While computer-readable storage medium 528 is shown in an illustrative example to be a single medium, the term "computer-readable storage medium" shall be taken to include a single medium or multiple media (e.g., a centralized or distributed database and/or associated caches and servers) that store one or more sets of instructions. The term "computer-readable storage medium" shall also be taken to include any medium that is capable of storing, encoding or carrying a set of instructions for execution by the machine and that causes the machine to perform the methods described herein. The term "computer-readable storage medium" shall accordingly be taken to include, but not be limited to, solid-state memories, optical media and magnetic media.

Examples described herein also relate to an apparatus for performing the methods and systems described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct a more specialized apparatus to perform the required method steps. The required structure for a variety of these systems will appear as set forth in the description above.

The above description is intended to be illustrative and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:
   receiving, by a computer system, a document from a requestor application;
   extracting layout information and text from the document;
   extracting, based on the layout information, values of one or more data items from the text of the document;
   producing a document validation result by analyzing the one or more data items and performing metadata validation by applying a metadata validation rule specifying an expected result of comparing a first metadata item associated with the document and the one or more data items extracted from the document;
   embedding, into the document, one or more human-readable comments reflecting the document validation result;
   associating, with the document, a second metadata item reflecting the document validation result;
   forwarding, to the requestor application, the document comprising the one or more human readable comments; and
   generating a data structure comprising one or more records, wherein a first record of the one or more records comprises a portion of the text and a layout tag associated with the portion of the text.

2. The method of claim 1, wherein receiving the document further comprises:
   pre-processing the document.

3. The method of claim 1, wherein the requestor application is represented by a workflow engine implementing a document review workflow.

4. The method of claim 3, wherein forwarding the document to the requestor further comprises:
   causing the document review workflow to update a status of the document.

5. The method of claim 1, further comprising:
identifying, within a document, a portion for a targeted review.

6. The method of claim 1, wherein the first metadata item characterizes a content category associated with the document.

7. The method of claim 1, wherein the first metadata item characterizes a review type associated with the document.

8. The method of claim 1, wherein the first metadata item characterizes an intended audience of the document.

9. The method of claim 1, wherein a first human-readable comment of the one or more human-readable comments comprises an instruction to be utilized by the requestor application for automatically generating a user notification.

10. The method of claim 1, further comprising:
wherein a second record of the one or more records comprises a second portion of the text and a functional tag associated with the second portion of the text.

11. The method of claim 1, further comprising:
identifying an intended audience of the document;
identifying a regulatory disclosure for the intended audience;
determining whether the regulatory disclosure is present in the document.

12. The method of claim 1, further comprising:
updating the status of the document in a workflow implemented by the requestor application.

13. A system, comprising:
a memory; and
a processing device operatively coupled to the memory, the processing device configured to:
receive a document from a requestor application;
extract layout information and text from the document;
extract, based on the layout information, values of one or more data items from the text of the document;
produce a document validation result by analyzing the one or more data items and performing metadata validation by applying a metadata validation rule specifying an expected result of comparing a first metadata item associated with the document and the one or more data items extracted from the document;
embed, into the document, one or more human-readable comments reflecting the document validation result;
associate, with the document, a second metadata item reflecting the document validation result;
forward, to the requestor application, the document comprising the one or more human readable comments; and
generate a data structure comprising one or more records, wherein a first record of the one or more records comprises an extracted portion of the text and a layout tag associated with the extracted portion of the text.

14. The system of claim 13, wherein receiving the document further comprises:
pre-processing the document.

15. The system of claim 13, wherein the requestor application is represented by a workflow engine implementing a document review workflow.

16. The system of claim 15, wherein forwarding the document to the requestor further comprises:
causing the document review workflow to update a status of the document.

17. A non-transitory computer-readable storage medium comprising executable instructions which, when executed by a computer system, cause the computer system to:
receive a document from a requestor application;
extract layout information and text from the document;
extract, based on the layout information, values of one or more data items from the text of the document;
produce a document validation result by analyzing the one or more data items and performing metadata validation by applying a metadata validation rule specifying an expected result of comparing a first metadata item associated with the document and the one or more data items extracted from the document;
embed, into the document, one or more human-readable comments reflecting the document validation result;
associate, with the document, a second metadata item reflecting the document validation result;
forward, to the requestor application, the document comprising the one or more human readable comments; and
generate a data structure comprising one or more records, wherein a first record of the one or more records comprises an extracted portion of the text and a layout tag associated with the extracted portion of the text.

18. The non-transitory computer-readable storage medium of claim 17, wherein receiving the document further comprises:
pre-processing the document.

19. The non-transitory computer-readable storage medium of claim 17, wherein forwarding the document to the requestor further comprises:
causing the requestor application to update a status of the document.

* * * * *